United States Patent
Gros et al.

(10) Patent No.: US 9,971,034 B2
(45) Date of Patent: May 15, 2018

(54) RANGEFINDER

(71) Applicant: Robert Bosch GmbH, Stuttgart (DE)

(72) Inventors: Nicolas Gros, Stuttgart (DE); Steffen Assmann, Waldenbuch (DE); Bjoern Kanzler, Reutlingen (DE); Heiko Fuellemann, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 81 days.

(21) Appl. No.: 14/266,413

(22) Filed: Apr. 30, 2014

(65) Prior Publication Data

US 2014/0327901 A1    Nov. 6, 2014

(30) Foreign Application Priority Data

May 3, 2013  (DE) .......................... 10 2013 208 164

(51) Int. Cl.
*G01S 17/08* (2006.01)
*G01S 7/51* (2006.01)
*G01C 3/08* (2006.01)

(52) U.S. Cl.
CPC ................ *G01S 17/08* (2013.01); *G01C 3/08* (2013.01); *G01S 7/51* (2013.01)

(58) Field of Classification Search
CPC ... G01C 3/08; G01S 7/51; G01S 17/00; G01S 17/36
USPC ............ 356/3.01–3.15, 4.01–4.1, 5.01–5.15, 356/6–22, 28, 28.5
See application file for complete search history.

(56) References Cited

U.S. PATENT DOCUMENTS

| 4,730,190 | A | * | 3/1988 | Win | G01S 7/295 342/118 |
| 5,926,260 | A | * | 7/1999 | Dunne | G01C 3/08 356/4.01 |
| 8,081,298 | B1 | * | 12/2011 | Cross | F41G 1/473 356/3.01 |
| 2004/0114129 | A1 | * | 6/2004 | Gogolla | G01C 3/08 356/4.01 |
| 2007/0137088 | A1 | * | 6/2007 | Peters | F41G 1/473 42/111 |
| 2010/0282845 | A1 | * | 11/2010 | Peters | F41G 1/473 235/414 |
| 2013/0010287 | A1 | * | 1/2013 | Tutton et al. | 356/213 |

FOREIGN PATENT DOCUMENTS

| CH | 699 337 A2 | 2/2010 |
| DE | 27 50 933 A1 | 5/1978 |
| DE | 691 25 863 T2 | 11/1997 |
| DE | 201 11 501 U1 | 11/2001 |
| DE | 20 2004 020 220 U1 | 8/2005 |
| DE | 10 2005 008 171 A1 | 11/2005 |
| DE | 600 15 612 T2 | 12/2005 |
| DE | 601 05 918 T2 | 3/2006 |

(Continued)

*Primary Examiner* — Luke D Ratcliffe
(74) *Attorney, Agent, or Firm* — Maginot, Moore & Beck LLP

(57) ABSTRACT

A rangefinder includes a display, an operator control element, a distance measuring apparatus, and a computation apparatus configured (i) to initiate a measurement by the distance measuring apparatus when the operator control element is operated, and (ii) to switch on at least the display when the operator control element is operated with the display switched off.

7 Claims, 2 Drawing Sheets

(56) References Cited

FOREIGN PATENT DOCUMENTS

| | | |
|---|---|---|
| DE | 10 2004 063 183 A1 | 7/2006 |
| DE | 600 30 019 T2 | 12/2006 |
| DE | 10 2006 013 695 A1 | 9/2007 |
| DE | 602 25 430 T2 | 3/2009 |
| DE | 10 2007 061 372 A1 | 6/2009 |
| DE | 10 2009 005 428 A1 | 7/2010 |
| DE | 20 2011 000 151 U1 | 4/2011 |
| DE | 10 2012 003 124 B3 | 5/2013 |
| WO | 96/13797 A2 | 5/1996 |

\* cited by examiner

RANGEFINDER

This application claims priority under 35 U.S.C. § 119 to patent application no. DE 10 2013 208 164.2, filed on May 3, 2013 in Germany, the disclosure of which is incorporated herein by reference in its entirety.

BACKGROUND

A rangefinder having a display, having an operator control element, having a distance measuring apparatus and having a computation apparatus that is provided for the purpose of initiating a measurement by the distance measuring apparatus when the operator control element is operated has already been proposed. The rangefinder has a further operator control element for switching on and off.

SUMMARY

A rangefinder having a display, an operator control element, a distance measuring apparatus and a computation apparatus that is provided for the purpose of initiating a measurement by the distance measuring apparatus when the operator control element is operated and switching on at least the display when the operator control element is operated with the display switched off is proposed. A "display" is intended to be understood to mean particularly an apparatus that is provided for the purpose of presenting a piece of information as a character and/or digit. In particular, the display is in the form of a display that appears meaningful to a person skilled in the art, but advantageously in the form of a liquid crystal display, in the form of an E-paper display, in the form of an OLED display and/or in the form of a segment display. In particular, an "operator control element" is intended to be understood to mean an element that is provided for the purpose of sensing operation by an operator and outputting a characteristic quantity that is dependent on the operation. Preferably, the operator control element is in the form of a pushbutton switch. A "distance measuring apparatus" is intended to be understood to mean an apparatus that is provided for the purpose of receiving a measurement signal radiated and/or reflected by a measurement object, determining a distance between a region of the distance measuring apparatus and the measurement object at least from the measurement signal and outputting a characteristic quantity that is dependent on the distance. Preferably, the distance measuring apparatus is provided for the purpose of transmitting the measurement signal and evaluating a component of the measurement signal that is reflected by the measurement object. With particular preference, the distance measuring apparatus is provided for the purpose of transmitting a laser beam and evaluating a reflected component of the laser beam. In particular, a "computation apparatus" is intended to be understood to mean an apparatus that is provided at least for the purpose of evaluating the reflected component of the laser beam on the basis of the operator input and/or outputting a result of the evaluation to the operator by means of the display. Preferably, the computation apparatus has a power supply apparatus, a processor, a memory, interfaces and control routines and computation routines that are stored in the memory and that are executed by the processor. Advantageously, the computation apparatus comprises a microprocessor. Advantageously, the computation apparatus and the distance measuring apparatus are partially in integral form. In particular, "provided" is intended to be understood to mean specifically programmed, designed and/or equipped. The fact that an object is provided for the purpose of a particular function is particularly intended to be understood to mean that the object performs and/or executes this particular function in at least one application and/or operating state. In particular, "operation" is intended to be understood to mean a process in which the operator control element alters an output characteristic quantity on the basis of an operator input. The expression "initiate a measurement" is particularly intended to be understood to mean that the distance measuring apparatus determines an interval from the measurement object and the computation apparatus outputs an absolute value for the interval to the operator by means of the display. In particular, a "switched-off display" is intended to be understood to mean an operating state of the display in which a presentation on the display in unalterable. Preferably, the switched-off display does not indicate a measurement result to the operator. Preferably, the switched-off display has its action at least essentially isolated from an electric power supply. In particular, "switch on" is intended to be understood to mean that the computation apparatus puts the display into an operating state in which the display indicates a current measurement result to the operator. The embodiment according to the disclosure allows a particularly inexpensive and easy-to-operate rangefinder to be provided.

In a further embodiment, it is proposed that the computation apparatus is provided for the purpose of initiating the measurement by the distance measuring apparatus in the event of a first type of operation of the operator control element and switching off at least the display in the event of a second type of operation, which is different than the first type of operation, with the display switched on, which allows particularly simple and convenient operator control. "Different types of operation" are intended to be understood to mean particularly operator-distinguishable manners of operating the operator control element. Preferably, the types of operation are distinguished by a duration for which the operator pushes the operator control element. Alternatively or in addition, the types of operation could be distinguished by a force of operation, a direction of operation and/or a number of instances of operation. A "switched-on display" is intended to be understood to mean particularly a display that is ready to receive and present a measurement result from the computation apparatus. In particular, the switched-on display is supplied with electric power.

Furthermore, it is proposed that the first type of operation is in the form of short operation of the operator control element and the second type of operation is in the form of long operation of the operator control element, which allows particularly simple and convenient operator control to be achieved. "Short operation" is intended to be understood to mean particularly operation of the operator control element that is shorter than long operation. Preferably, the computation apparatus has a threshold value. The computation apparatus interprets operation for shorter than the threshold value as short operation and operation for longer than the threshold value as long operation.

Furthermore, it is proposed that the computation apparatus is provided for the purpose of activating a measurement mode when the operator control element is operated with the display switched off, which allows particularly simple and convenient operator control. A "measurement mode" is intended to be understood to mean particularly an operating state in which the computation apparatus indicates readiness for measurement to the operator, advantageously by means of the display. Preferably, the computation apparatus is provided for the purpose of switching on the display when the operator control element is operated with the display switched off.

It is also proposed that the computation apparatus is provided for the purpose of activating a configuration mode when the operator control element is operated with the display switched off, which allows functional diversity and advantageous operator control in a particularly simple manner. A "configuration mode" is intended to be understood to mean particularly an operating state of the computation apparatus in which at least one characteristic quantity of the computation apparatus that influences a measurement cycle and/or a measurement result can be altered.

In addition, it is proposed that the computation apparatus is provided for the purpose of alternately changing between configurations of the configuration mode while the operator control element is being operated, which allows a particularly simple design and advantageous operator control to be achieved. "Configurations of the configuration mode" are intended to be understood to mean particularly a setting for a parameter that can be set in different ways by the operator. In particular, the term "alternately changing" is intended to be understood to mean that the parameter recurrently alters the configuration after a particular time until the operator interrupts the alteration of the parameter. Preferably, the operator interrupts the alteration of the parameter by operating the operator control element again or, with particular preference, by releasing the operator control element. In particular, the configurations alternate while the operator is operating the operating control element.

In one advantageous form of the disclosure, it is proposed that the computation apparatus is provided for the purpose of simultaneously presenting a last measurement and a penultimate measurement on the display in at least one operating state, which means that an operator input is not required in order to present the penultimate measurement. In particular, the expression "simultaneously presenting" is intended to be understood to mean that in an operating state the display indicates the last measurement in one region and the penultimate measurement in a second region.

Furthermore, it is proposed that the computation apparatus is provided for the purpose of presenting a sum and/or a product of a last measurement and of a penultimate measurement on the display regardless of operation of the operator control element, which means that an operator input is not required in order to present the sum and/or the product. The expression "regardless of operation of the operator control element" is intended to be understood to mean particularly that the computation apparatus presents the sum and/or the product of the last measurement and of the penultimate measurement to the operator regardless of a setting on the computation apparatus. Preferably, the computation apparatus presents the sum and/or the product of the last measurement and the penultimate measurement to the operator constantly by means of the display. Alternatively or in addition, the computation apparatus could present a last measurement, a current sum and a last sum to the operator simultaneously.

In this case, the rangefinder according to the disclosure is not intended to be limited to the application and embodiment described above. In particular, the rangefinder according to the disclosure may have a number of individual elements, parts and units that differs from a number cited herein in order to accomplish a mode of operation that is described herein.

BRIEF DESCRIPTION OF THE DRAWINGS

Further advantages will emerge from the description of the drawings below. The drawing shows an exemplary embodiment of the disclosure. The drawing, the description and the claims contain numerous features in combination. A person skilled in the art will expediently also consider the features individually and merge them to form meaningful further combinations.

In the drawing.

DETAILED DESCRIPTION

Figure 1:
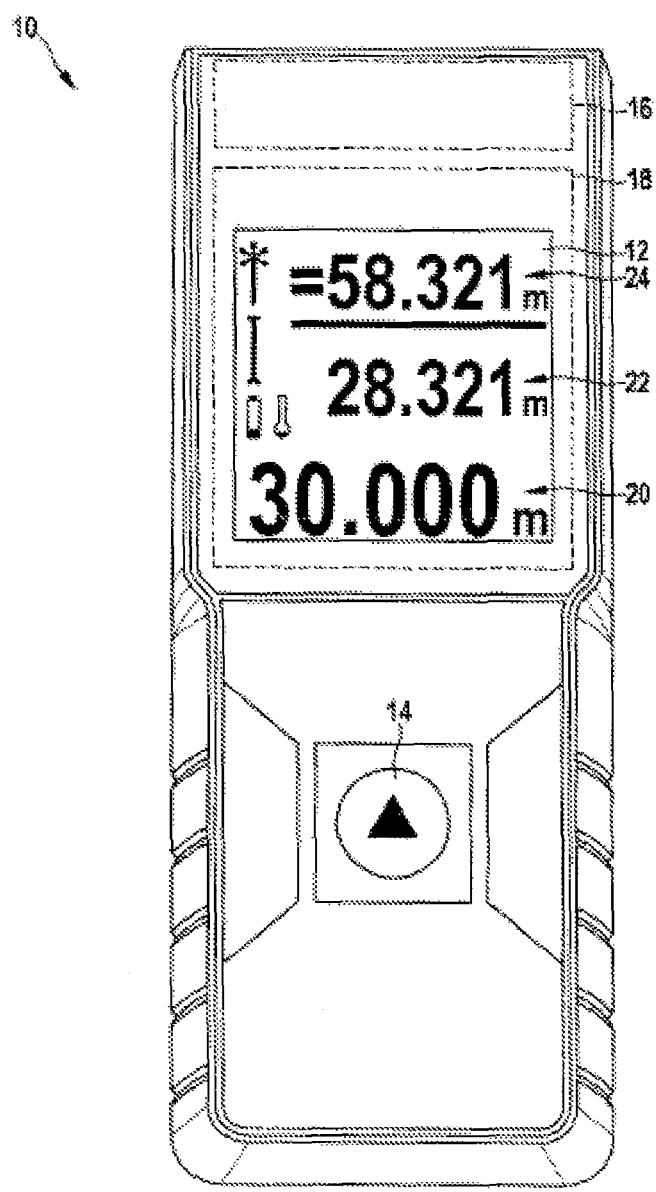
FIG. 1 shows a rangefinder according to the disclosure.

FIG. 1 shows a rangefinder 10 according to the disclosure having a display 12, an operator control element 14, a distance measuring apparatus 16 and a computation apparatus 18. The display 12 is provided for the purpose of visually outputting information to an operator. The operator control element 14 is in the form of a pushbutton switch. The operator control element 14 outputs an electrical signal that is dependent on operation by the operator.

The distance measuring apparatus 16 has a transmitter and a receiver. The transmitter is in the form of a laser. The receiver is provided for the purpose of receiving a signal from the transmitter, which signal is reflected by a measurement object. The distance measuring apparatus 16 is provided for the purpose of evaluating a modulation and/or a propagation time for the reflected signal. The distance measuring apparatus 16 outputs a signal that has a characteristic quantity with a measurement result.

During a measurement process, the computation apparatus 18 outputs the measurement result to the operator via the display 12 on the basis of the signal from the distance measuring apparatus 16. In addition, the computation apparatus 18 controls the distance measuring apparatus 16 on the basis of an operator input by means of the operator control element 14. In this case, the computation apparatus 18 makes a distinction between two types of operation 26, 28. A first of the types of operation 26 is in the form of short operation of the operator control element 14. A second of the types of operation 28 is in the form of long operation of the operator control element 14. The computation apparatus 18 has a threshold value. Operation for shorter than the threshold value is interpreted by the computation apparatus 18 as short operation. Operation for longer than the threshold value is interpreted by the computation apparatus 18 as long operation. The threshold value is two seconds, for example.

In a switched-off operating state 30, the display 12 is switched off. In addition, the distance measuring apparatus 16 and the computation apparatus 18 are in a power saving state. Operation of the operator control element 14 in the switched-off operating state 30 using one of the two types of operation 26, 28 changes the rangefinder 10 to a switched-on operating state 32. In the switched-on operating state 32, at least the display 12 and the computation apparatus 18 are activated.

Figure 2:
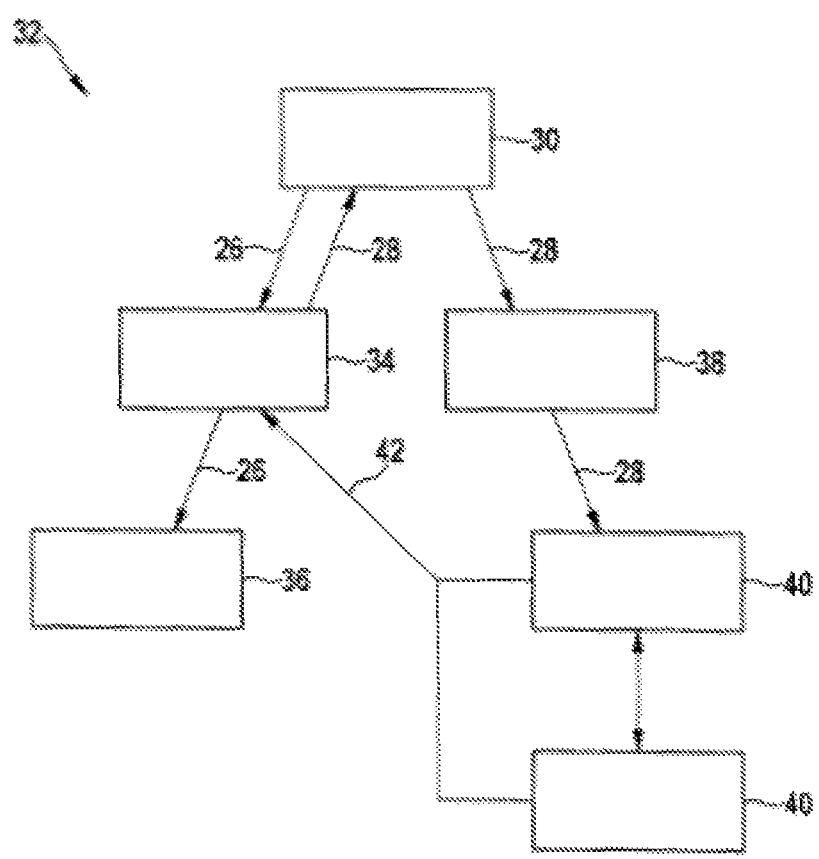
FIG. 2 shows a method for operator control of the range finder from FIG. 1.

FIG. 2 shows a method for operator control of a rangefinder 10. When the rangefinder 10 is switched on by operation of the operator control element 14 using the first type of operation 26, the computation apparatus 18 activates a measurement mode 34. When the operator control element 14 is operated in the measurement mode 34 using the first type of operation 26, the computation apparatus 18 initiates a measurement 36 by the distance measuring apparatus 16. When the operator control element 14 is operated in the measurement mode 34 using the second type of operation 28, the rangefinder 10 changes to the switched-off operating state 30. In this case, the computation apparatus 18 switches off the display 12.

When the rangefinder 10 is switched on by operation of the operator control element 14 using the second type of operation 28, the computation apparatus 18 activates a configuration mode 38. In this case, a parameter can be altered between different configurations 40 in the configuration mode 38. The computation apparatus 18 is provided for the purpose of alternately changing between configurations 40 of the configuration mode 38 while the operator control element 14 is being operated. The parameter configuration 40 that is selected at the end of operation 42 of the operator control element 14 is then active. When the operator releases the operator control element 14, the computation apparatus 18 changes to the measurement mode 34.

Alternatively, a configuration mode could allow configuration of a plurality of parameters. By way of example, in the configuration mode the first type of operation could change a configuration for one of the parameters and the second type of operation could prompt a change to a next one of the parameters or to a menu item for storing the configuration mode. By way of example, a parameter could be used to switch a key tone on and off, a parameter could be used to change over between imperial and metric units and/or a parameter could be used to change over between indication of a sum and of a product.

The computation apparatus 18 is provided for the purpose of simultaneously presenting at least a last measurement 20, a penultimate measurement 22 and a sum 24 of the last measurement 20 and the penultimate measurement 22 on the display 12 after two measurements. In the configuration mode, it might be possible to set that the computation apparatus 18 is provided for the purpose of simultaneously presenting a last measurement 20, a penultimate measurement 22 and a product of the last measurement 20 and the penultimate measurement 22 after two measurements. Furthermore, a volume could be indicated as the product of the last three measurements after a third measurement.

What is claimed is:

1. A rangefinder comprising:
  a display;
  an operator control element comprising a single pushbutton;
  a distance measuring apparatus; and
  a computation apparatus configured (i) to initiate a measurement by the distance measuring apparatus when the single pushbutton is operated with the display switched on, and (ii) to switch on at least the display when the single pushbutton is operated with the display switched off,
  wherein the computation apparatus is further configured to simultaneously present at least a last measurement and a penultimate measurement on the display in at least one operating state,
  wherein the computation apparatus is further configured (i) to initiate the measurement by the distance measuring apparatus in the event of a first type of operation of the single pushbutton, and (ii) to switch off at least the display in the event of a second type of operation of the single pushbutton, which is different than the first type of operation, with the display switched on, and
  wherein:
    the first type of operation comprises the single pushbutton being pressed for a first duration, and
    the second type of operation comprises the single pushbutton being pressed for a second duration that is longer than the first duration.

2. The rangefinder according to claim 1, wherein the computation apparatus is further configured to activate a measurement mode when the single pushbutton is operated with the display switched off.

3. The rangefinder according to claim 1, wherein the computation apparatus is further configured to activate a configuration mode when the single pushbutton is operated with the display switched off.

4. The rangefinder according to claim 3, wherein the computation apparatus is further configured to alternately change between configurations of the configuration mode while the single pushbutton is being operated.

5. The rangefinder according to claim 1, wherein the computation apparatus is further configured to present a sum and/or a product of a last measurement and of a penultimate measurement on the display regardless of operation of the single pushbutton.

6. A rangefinder comprising:
  a display;
  an operator control element comprising a pushbutton;
  a distance measuring apparatus; and
  a computation apparatus configured (i) to initiate a measurement by the distance measuring apparatus when the pushbutton is operated, and (ii) to switch on at least the display when the pushbutton is operated with the display switched off, and
  wherein the computation apparatus is further configured to activate a configuration mode when the single pushbutton is operated with the display switched off,
  wherein the computation apparatus is further configured to alternately change between configurations of the configuration mode while the pushbutton is being operated.

7. A rangefinder comprising:
  a display;
  an operator control element comprising a pushbutton;
  a distance measuring apparatus; and
  a computation apparatus configured (i) to initiate a measurement by the distance measuring apparatus when the pushbutton is operated with the display switched on, and (ii) to switch on at least the display when the pushbutton is operated with the display switched off,
  wherein the computation apparatus is further configured to simultaneously present at least a last measurement and a penultimate measurement on the display in at least one operating state,
  wherein the computation apparatus is further configured (i) to initiate the measurement by the distance measuring apparatus in the event of a first type of operation of the pushbutton, and (ii) to switch off at least the display in the event of a second type of operation of the pushbutton, which is different than the first type of operation, with the display switched on, and
  wherein:
    the first type of operation comprises the pushbutton being pressed for a first duration, and
    the second type of operation comprises the pushbutton being pressed for a second duration that is longer than the first duration.

* * * * *